United States Patent
Berkenpas

(10) Patent No.: US 12,245,714 B2
(45) Date of Patent: Mar. 11, 2025

(54) FRUIT JUICER WITH INTEGRAL FUNNEL

(71) Applicant: BRIANLISA FMB, LLC, Sioux City, IA (US)

(72) Inventor: Brian Berkenpas, Lawton, IA (US)

(73) Assignee: BRIANLISA FMB, LLC, Sioux City, IA (US)

( * ) Notice: Subject to any disclaimer, the term of this patent is extended or adjusted under 35 U.S.C. 154(b) by 0 days.

(21) Appl. No.: 17/949,055

(22) Filed: Sep. 20, 2022

(65) Prior Publication Data

US 2024/0090697 A1    Mar. 21, 2024

(51) Int. Cl.
| | | |
|---|---|---|
| *A47J 19/02* | (2006.01) | |
| *A23L 19/00* | (2016.01) | |
| *A47J 19/00* | (2006.01) | |
| *B67C 11/02* | (2006.01) | |
| *C12C 5/02* | (2006.01) | |

(52) U.S. Cl.
CPC ............ *A47J 19/023* (2018.08); *A23L 19/00* (2016.08); *A47J 19/005* (2013.01); *B67C 11/02* (2013.01); *C12C 5/026* (2013.01); *A23V 2002/00* (2013.01)

(58) Field of Classification Search
CPC ....... A47J 19/023; A47J 19/005; A23L 19/00; B67C 11/02; C12C 5/026; A23V 2002/00
USPC .......................................................... 99/510
See application file for complete search history.

(56) References Cited

U.S. PATENT DOCUMENTS

| | | | | |
|---|---|---|---|---|
| 587,860 | A * | 8/1897 | Redmon | A47J 19/02 100/234 |
| 599,856 | A * | 3/1898 | Middlekauff | A47J 19/023 100/130 |
| 612,362 | A * | 10/1898 | Middlekauff | A47J 19/023 100/130 |
| 1,362,135 | A * | 12/1920 | Plughoff | A47J 19/02 99/508 |
| 2,535,553 | A * | 12/1950 | Stoner | A47J 19/023 100/130 |
| 6,966,256 | B2 * | 11/2005 | Canizares | B30B 9/04 100/234 |
| 7,293,502 | B2 * | 11/2007 | So | A47J 19/04 99/506 |
| 9,089,232 | B1 * | 7/2015 | Parazynski | A47G 21/106 |
| 9,730,466 | B1 * | 8/2017 | Schmieding | A47J 19/023 |

(Continued)

FOREIGN PATENT DOCUMENTS

KR        101259148 B1 *  7/2012

OTHER PUBLICATIONS https://www.amazon.com/Rated-Zulay-Premium-Quality-Squeezer/dp/B00YBP918M/ref=sr_1_2_sspa?crid=YF76G6YQJ9CT&keywords=lemon+juic%E2%80%A6, Sep. 20, 2022, 11 pages.

*Primary Examiner* — Steven W Crabb
*Assistant Examiner* — Ket D Dang
(74) *Attorney, Agent, or Firm* — Nyemaster Goode P.C.

(57) ABSTRACT

A juicer has a presser portion with an upper squeezing cup, an upper handle, and an upper hinge portion on the opposite side of the upper squeezing cup from the upper handle and having a through hole configured to receive a hinge pin. The juicer has a funnel portion with a lower squeezing cup having a funnel disposed at its lowest point, a lower handle, and a lower hinge portion disposed on the opposite side of the lower squeezing cup from the lower handle and having a through hole configured to receive the hinge pin. The juicer also has a removable colander between the upper squeezing cup and the lower squeezing cup.

19 Claims, 5 Drawing Sheets

(56) References Cited

U.S. PATENT DOCUMENTS

| | | | | |
|---|---|---|---|---|
| 2006/0021519 A1* | 2/2006 | Shen | ........................ | A47J 19/06 |
| | | | | 99/501 |
| 2007/0289455 A1* | 12/2007 | Dorion | ................... | A47J 19/023 |
| | | | | 100/213 |
| 2009/0007342 A1* | 1/2009 | Clark, Jr. | ................... | B25F 1/00 |
| | | | | 7/155 |
| 2013/0186289 A1* | 7/2013 | Garcia | ................... | A47J 19/023 |
| | | | | 100/131 |
| 2015/0257571 A1* | 9/2015 | Shen | ........................ | A47J 19/06 |
| | | | | 99/495 |
| 2017/0181580 A1* | 6/2017 | Wong | ........................ | A47J 43/04 |

* cited by examiner

FRUIT JUICER WITH INTEGRAL FUNNEL

BACKGROUND

Traditional juicer mechanisms have a number of problems. They are sometimes impossible to use with one hand, generally simply drop juice from the entire lower surface of the juicer, and can be difficult to clean and ready for multiple fruits. As a result, users often resort to previously processed juice in a bottle or other vessel, but such juice is not fresh and may include preservatives that the consumer may want to avoid.

SUMMARY

One aspect of the present disclosure generally includes a juicer having a presser portion with an upper squeezing cup, an upper handle, and an upper hinge portion on the opposite side of the upper squeezing cup from the upper handle and having a through hole configured to receive a hinge pin. The juicer has a funnel portion with a lower squeezing cup having a funnel disposed at its lowest point, a lower handle, and a lower hinge portion disposed on the opposite side of the lower squeezing cup from the lower handle and having a through hole configured to receive the hinge pin. The juicer also has a removable colander between the upper squeezing cup and the lower squeezing cup. The removable colander may be removable by hand and without the use of tools. The colander may also conceivably be hingedly connected to either the upper squeezing cup or the lower squeezing cup.

Another aspect of the present disclosure generally includes a juicer having a squeeze handle with a squeeze cup, an upper hinge, and an upper lever extending from the squeeze cup in a direction opposite from the upper hinge, a base handle with a base cup with a downwardly extending funnel, a base hinge, and a base lever extending from the base cup in a direction opposite from the base hinge, and a strainer having a half-sphere shape removably disposed within base cup. The strainer typically may be removed by hand and without the use of tools. The strainer has a concave surface, an opposite convex surface and a plurality of holes extending through the colander from the concave surface to the convex surface to allow juice from a fruit being juiced via compression from the squeeze cup to drain into and through base cup.

Yet another aspect of the disclosure generally includes a method of juicing a fruit or a vegetable to yield juice from the fruit or the vegetable and directly delivering the juice from the fruit or the vegetable into a bottle having a neck portion and a main body portion having a larger cross-sectional area than a cross sectional area of the neck portion and including a beverage therein. The method includes inserting the funnel of a juicer into the neck portion of the bottle, inserting a portion of a fruit or vegetable or a whole fruit or vegetable into the upper squeezing cup and using manual force to bring the upper handle into a location proximate the lower handle thereby applying a force with a bottom surface of the upper squeezing cup to the portion of the fruit or vegetable or the whole fruit or vegetable thereby delivering juice from the fruit or vegetable or the whole fruit or vegetable and delivering the juice by gravity directly into engagement with the beverage within the bottle. The juicer used in connection with the method typically includes a presser portion with an upper squeezing cup, an upper handle, and an upper hinge portion on the opposite side of the upper squeezing cup from the upper handle and having a through hole configured to receive a hinge pin. The juicer has a funnel portion with a lower squeezing cup having a funnel disposed at its lowest point, a lower handle, and a lower hinge portion disposed on the opposite side of the lower squeezing cup from the lower handle and having a through hole configured to receive the hinge pin. The juicer also may have a removable colander between the upper squeezing cup and the lower squeezing cup.

These and other aspects, objects, and features of the present invention will be understood and appreciated by those skilled in the art upon studying the following specification, claims, and appended drawings.

DETAILED DESCRIPTION

Figure 1:
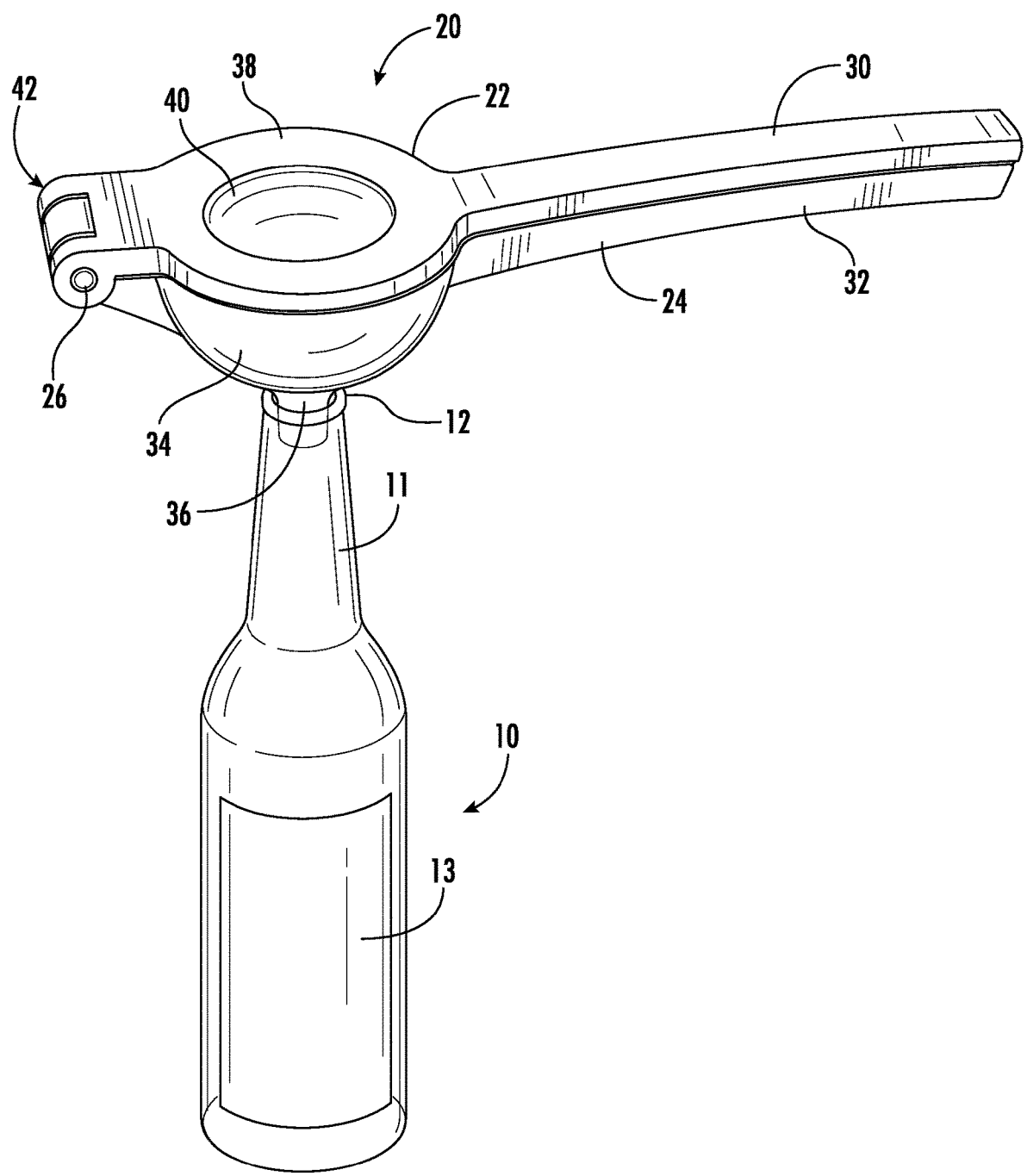
FIG. 1 is an elevated view of a juicer and a vessel according to an aspect of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure and claimed invention, and further it is to be understood that such concepts are intended to be covered by the following claims unless these claims by their language expressly state otherwise.

It is to be understood that the disclosed innovations may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Where a range of values is provided, it is understood that each intervening value, to the tenth of the unit of the lower limit unless the context clearly dictates otherwise, between the upper and lower limit of that range, and any other stated or intervening value in that stated range, is encompassed within the scope of the present disclosure. The upper and lower limits of these smaller ranges may independently be included in the smaller ranges, and are also encompassed within the scope of the present disclosure, subject to any specifically excluded limit in the stated range. Where the stated range includes one or both of the limits, ranges excluding either or both of those included limits are also included in the scope of the present disclosure. All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, 10) contained within the range. In this specification and the appended claims, the singular forms "a," "an" and "the" include plural reference unless the context clearly dictates otherwise. All combinations of method steps or process steps as used herein can be performed in any order, unless otherwise specified or clearly implied to the contrary by the context in which the referenced combination is made To the extent that the terms "includes" or "including" or "have" or "having" are used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A" or "B" or both "A" and "B". When the Applicant intends to indicate "only A or B but not both" then the term "only A or B but not both" or similar structure will be employed. Thus, use of the term "or" herein is the inclusive, and not the exclusive use. Also, to the extent that the terms "in" or "into" are used in the specification or the claims, it is intended to additionally mean "on" or "onto." In this specification and the appended claims, the singular forms "a," "an" and "the" include plural reference unless the context clearly dictates otherwise.

Freshly squeezing juices from the fruit into a bottled beverage, such as lime and/or lemon squeezed into a beverage such as an alcoholic beverage such as a beer with an elongated bottle neck is extremely difficult and nearly impossible to do with one hand using current devices and systems. FIG. 1 generally shows a juicer 20 that is as shown preferably situated above a vessel such as a bottle 10 (shown) as desired. The bottle 10 may be any liquid containing vessel, but is typically an elongated necked alcoholic beverage bottle such as a beer bottle or could be a soda pop bottle as well. The bottle is typically a glass bottle but could also be made of a plastic material such as polyethylene terephthalate or other recyclable plastic material. PET consists of polymerized units of the monomer ethylene terephthalate, with repeating ($C_{10}H_8O_4$) units.

As shown in FIG. 1, a funnel portion includes: a lower squeezing cup 34 having a funnel 36 disposed at its lowest point; handle 32; and a lower hinge portion. A narrow end of the funnel 36, which is typically a hollow cylindrical shape with a flat circular or conceivably a pointed end for a smaller stream of juice into the bottle 10, may be inserted into the narrow neck 11 of the bottle 10. The neck 11 may have a smaller cross-sectional surface area (typically a smaller diameter) than the main body portion 13, which has a larger cross-sectional surface area since the main body portion holds a majority of the liquid therein. The liquid therein may be any beverage, but is typically soda pop, water, or beer.

As shown in more detail in FIGS. 2-9, The juicer 20 may include a base half 24 and a squeeze half 22. Although referenced as a base "half" and a squeeze "half" the base half 24 and the squeeze half 22 are meant to reference that there are two segments that are typically about one half each of the overall assembly when engaged with one another, but it is conceivable that one or the other of the base half and the squeeze half could make up more or less than half of the overall construction volume than the other. The base half 24 and the squeeze half 22 may be hingedly coupled about a hinge pin 26 at a first end of the juicer 20. A squeeze handle 30 may extend on the squeeze half 22 away from the hinge pin 26 and a base handle 32 may extend on the base half 24 away from the hinge pin 26. The handle 30 and the handle 32 together act as levers to increase mechanical advantage in squeezing the fruit within the juicer. The handles are typically sized to fit an adult hand and are typically from about 2 to about 5 inches long. The handles could conceivably be longer to provide more force, but the device may be harder to use with a single hand of the user and if too short, may not provide the requisite leverage for ease of juicing. The handles 30, 32, are typically integrally formed with the remaining portions of the base half 24 and the squeeze half 22 that operate to actually apply force to and engage the fruit or fruit piece(s) or vegetable or vegetable pieces or both fruit and vegetables or fruit and vegetable pieces.

Figure 3:
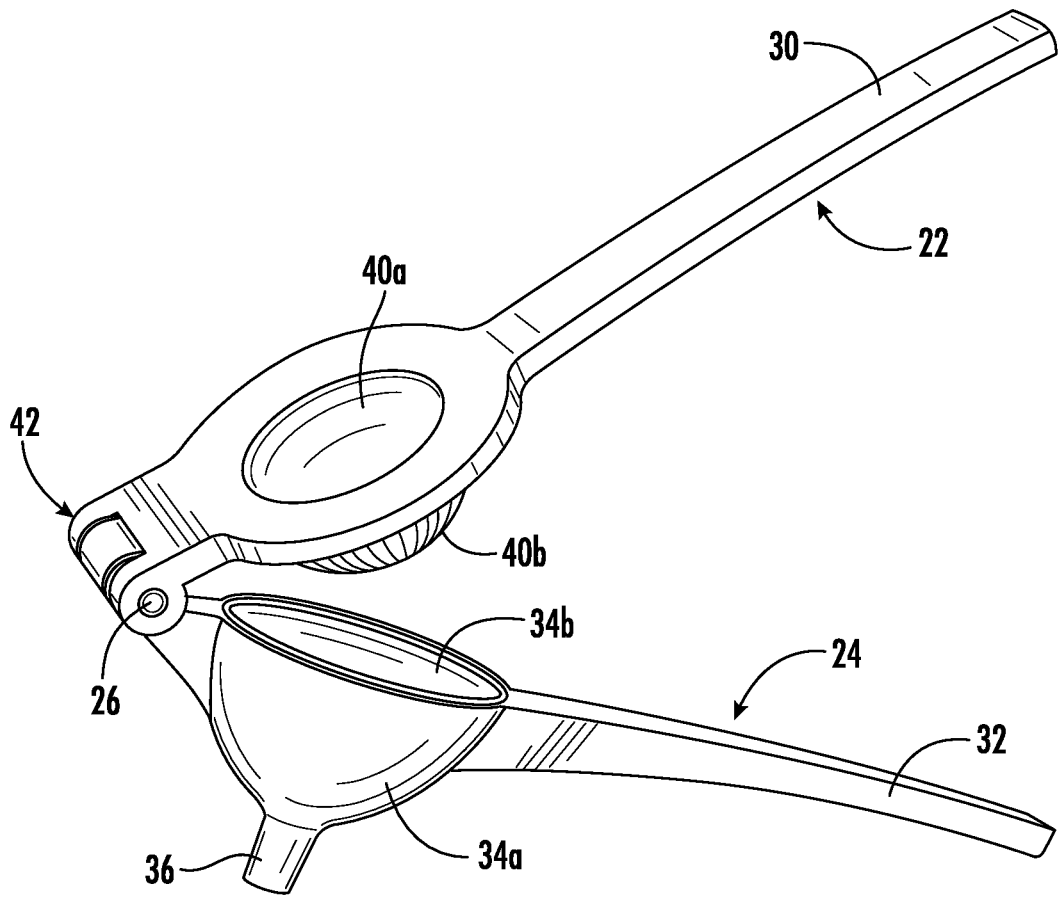
FIG. 3 is a side view of a juicer in an open state.
Figure 4:
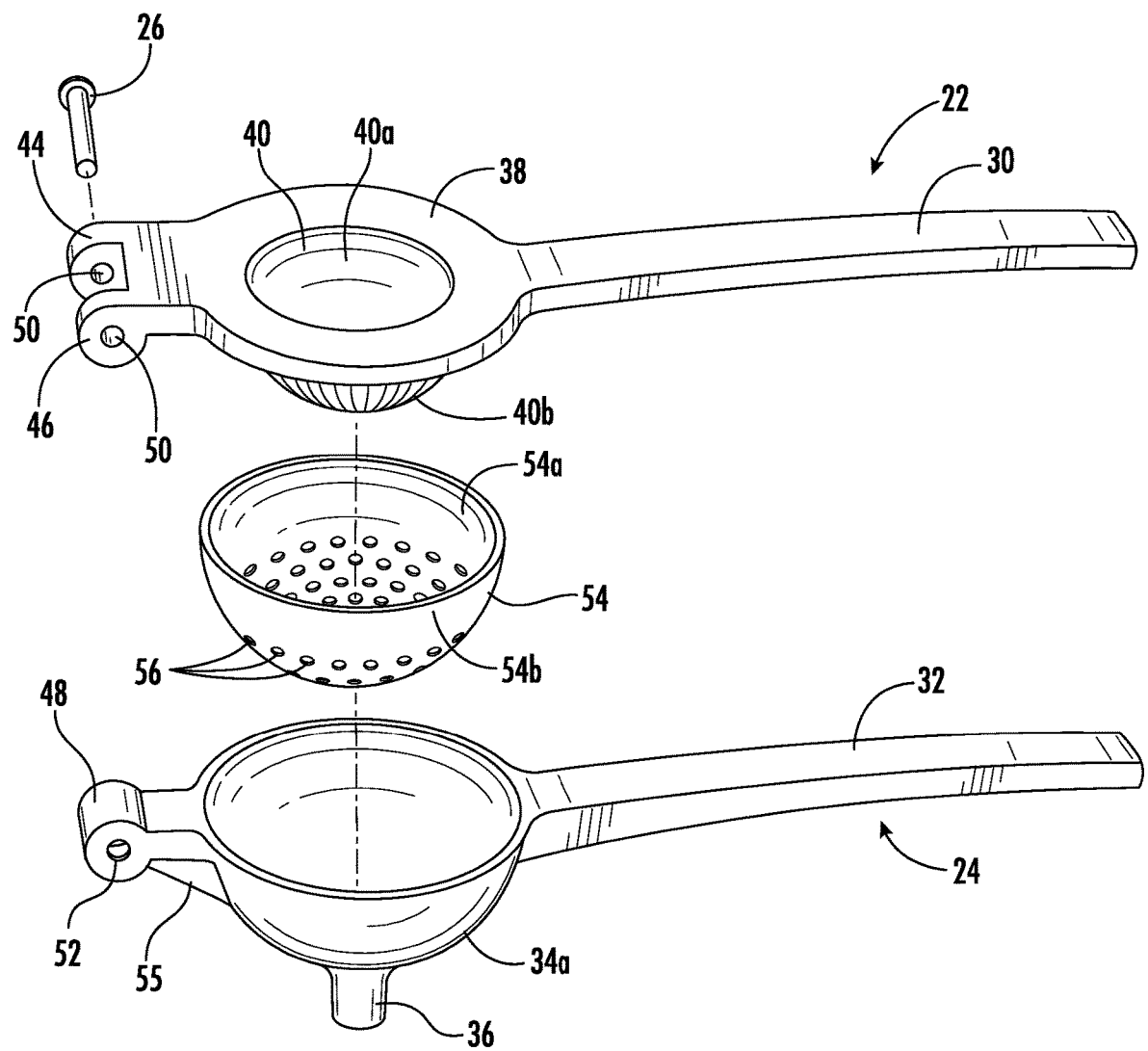
FIG. 4 is an exploded view of a juicer according to an embodiment of the present disclosure.
Figure 5:
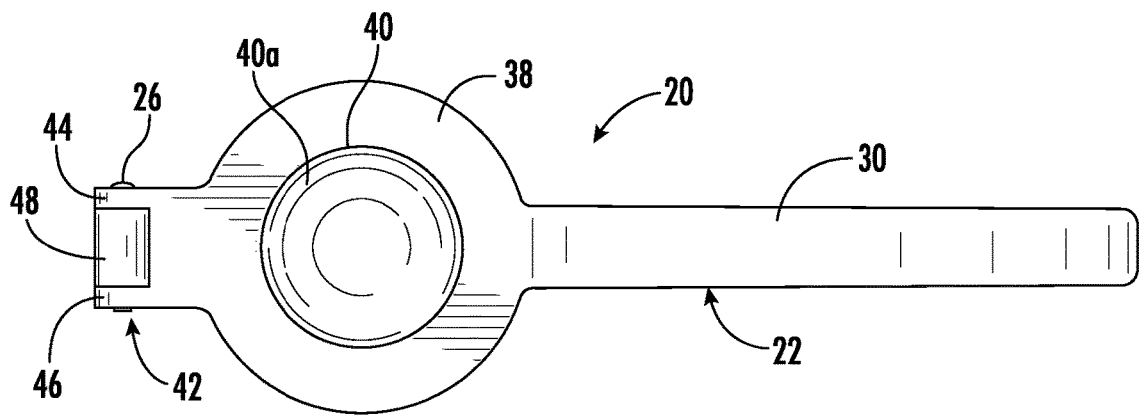
FIG. 5 is a top view of an embodiment of the juicer.

As shown in FIGS. 3-4, the hinge 42 may have first and second bosses 44, 46 on the squeeze half, optionally, first and second bosses engaged with a side of the strainer 54, and a main boss 48 on the base half all of which have through holes 50, 52 to contain the hinge pin 26 when aligned with one another and the pin is positioned therein. The through holes 50, 52 on one of the squeeze half or the base half may be an interference fit to the hinge pin 26 to hold the hinge pin in place. In other embodiments, the first and second bosses may be on the base half and the main boss may be on the squeeze half. In still other embodiments, the through holes 50, 52 are all clearance and the hinge pin 26 is held in place by other means such as a lock pin, a safety pin, a split pin, a cotter pin or a hitch pin clip that is placed through a hole in one or both ends of the pin to retain it in place. Any food safe fastener could conceivably be used to hold the base half 24 and squeeze half 22 in a hinged relationship with one another.

It should also be known that the hinge portion of the juicer need not have a hinge pin at all. Hinge portions, namely, the first boss 44, the second boss 46, and the main boss 48, may be shaped and sized such that they may be removably attached in a connecting position such as at an angle greater than 90 degrees, and interfere with one another as the handles are brought together such that the base half 24 and the squeeze half 22 may not be disassembled in use, and then may be disassembled after use by re-opening past the connecting position.

Figure 2:
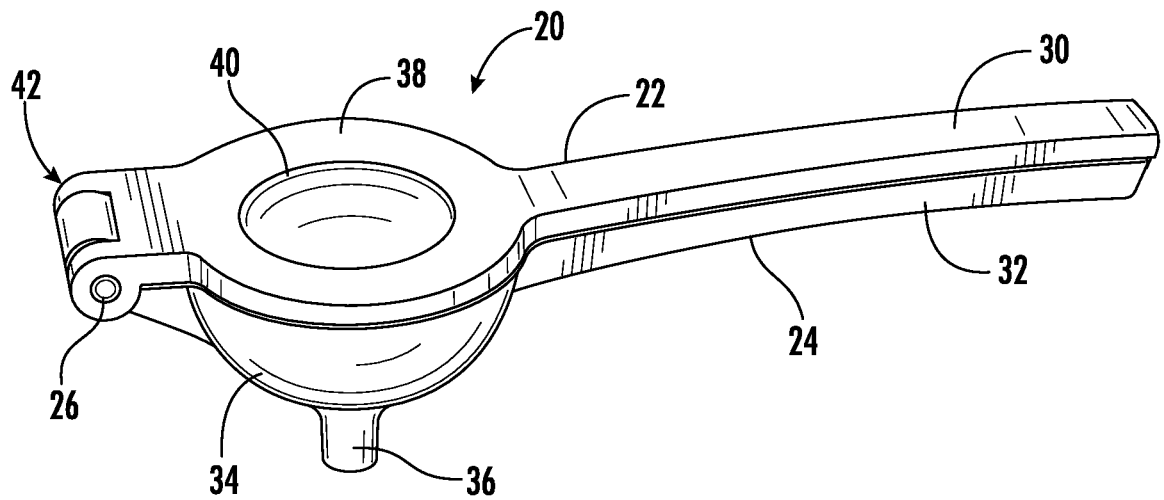
FIG. 2 is an elevated view of a juicer in a squeezed state according to an aspect of the present disclosure.

Between the hinge 42 of the juicer 20 and the handle parts 30, 32 may be the squeezing cups 40, 34 (See FIG. 2). Upper squeezing cup 40 may be surrounded by a substantially round flange 38 supporting the upper squeezing cup 40 and circumferentially positioned around the upper squeezing cup (See FIG. 3). The upper squeezing cup has an upward facing recessed surface 40a and a fruit(s) and/or vegetable(s) facing, squeezing surface 40b. The concave or squeezing part/surface 34b of the lower squeezing cup 34 faces the opposite side of the fruit being juiced. The downward facing outer surface 34a typically has a corresponding shape as the concave or squeezing part/surface 34b. There may be a generally triangular reinforcing ridge that interconnects the lower squeezing cup and at least a portion of the hinge 42 to provide greater durability for the hinge. The hinge could conceivably be a generally planar projection instead of a structure having a triangularly-shaped support 55. The convex or squeezing surface 40b of the upper squeezing cup 40 faces the fruit that is being squeezed and may include ribs to aid in squeezing the juice from the fruit being juiced. The ribs may further squeeze the fruit between longitudinal portions (i.e., in the direction of the ribs shown on the convex or squeezing surface 40b in FIG. 4) to more efficiently separate the juice from the fruit itself. Ribs are typically used but are not necessary.

Upper squeezing cup 40 fits substantially within lower squeezing cup 34. In other words, when the handles 30, 32 are pressed together, the upper squeezing cup 40 may reach down within the interior of the lower squeezing cup 34 to squeeze the item being juiced, while leaving an amount of clearance for the remains of the fruit that is being squeezed like the skin or peel and the pulp. The upper squeezing cup and lower squeezing cup substantially mate with one another when squeezing. While typically generally semispherical in shape, the upper squeezing cup 40 and lower squeezing cup 34 may be other form fitting shaped such as cuboidal, a parallelotope, an orthotope, or pyramidal shaped, but such a configuration may be more difficult to clean and retrieve all of the juice therefrom. The mating relationship and having a low point on the lower squeezing cup to have gravity help pull the juice to the funnel 36 or other similar juice outlet that allows juice to flow directly out of the juicer into the bottle or other vessel upon being juiced and typically directly thereafter upon the force of gravity acting on the juice.

The juicer 20 may include a funnel portion that includes funnel 36 or other outlet that fits within a top opening 12 of the vessel 10. Typically, the funnel 36 will have an external diameter of about two inches or less, more typically about 1¼ inch, most typically about ¾ or ¹¹⁄₁₆ inch or less (less than the diameter of the narrowest point of, for example, a CARONA® beer bottle, which is ¹¹⁄₁₆ or less in narrowest interior diameter, and sized to allow the funnel to be inserted within the topmost portion of a beer or soda bottle/liquid vessel. For example, the funnel's exterior diameter may be ⅝$^{th}$ inch or ½ inch to ensure it can be easily inserted into the interior volume of the portion of the bottle/vessel proximate the bottle/vessel's outlet/inlet prior to juice being squeezed. Juice from the fruit that is being squeezed between the upper squeezing cup 40 and the lower squeezing cup 34 is directed by the lower squeezing cup 34 into the funnel 36, where it is directed by the funnel 36 out of an opening at the bottom of the funnel into the vessel 10. Having the funnel 36 integral with the lower squeezing cup allows a user to use a single tool to squeeze juice into a vessel 10 with a small opening like a bottle without using a separate part and using a single human hand.

Figure 6:
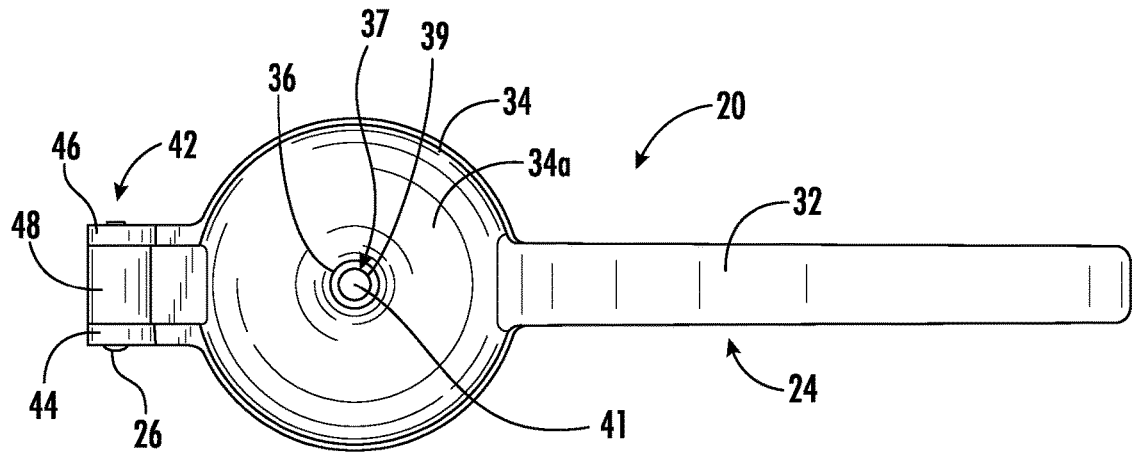
FIG. 6 is a bottom view of an embodiment of the juicer.
Figure 7:
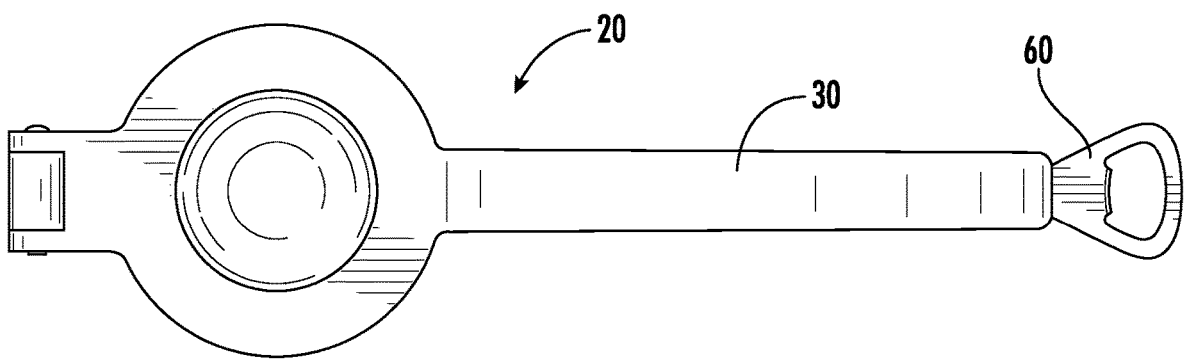
FIG. 7 is another top view of an embodiment of the juicer having a bottle opener on one end.
Figure 8:
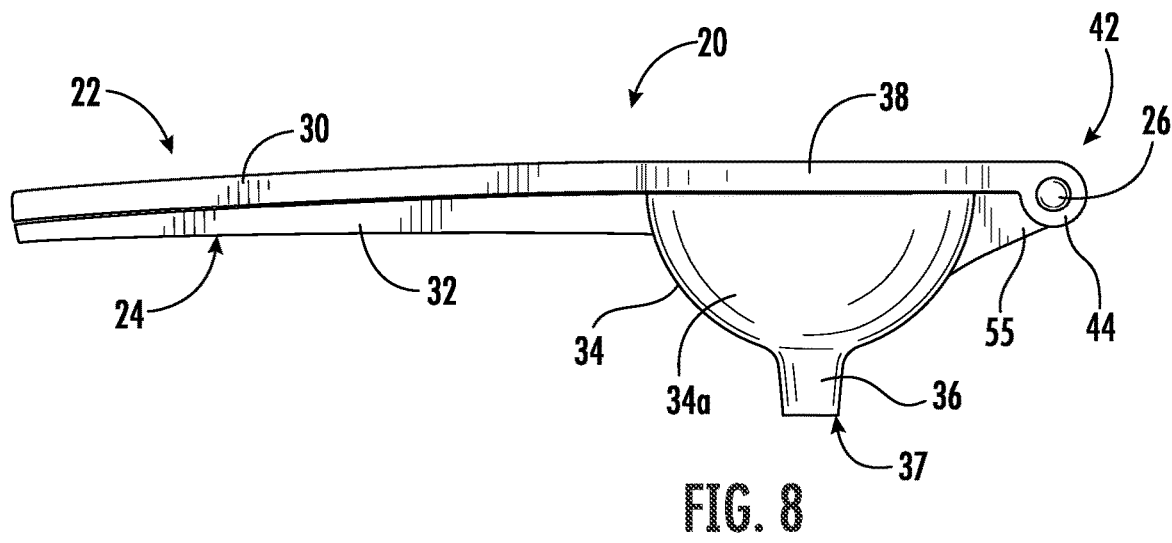
FIG. 8 is a side view of an embodiment of the juicer.
Figure 9:
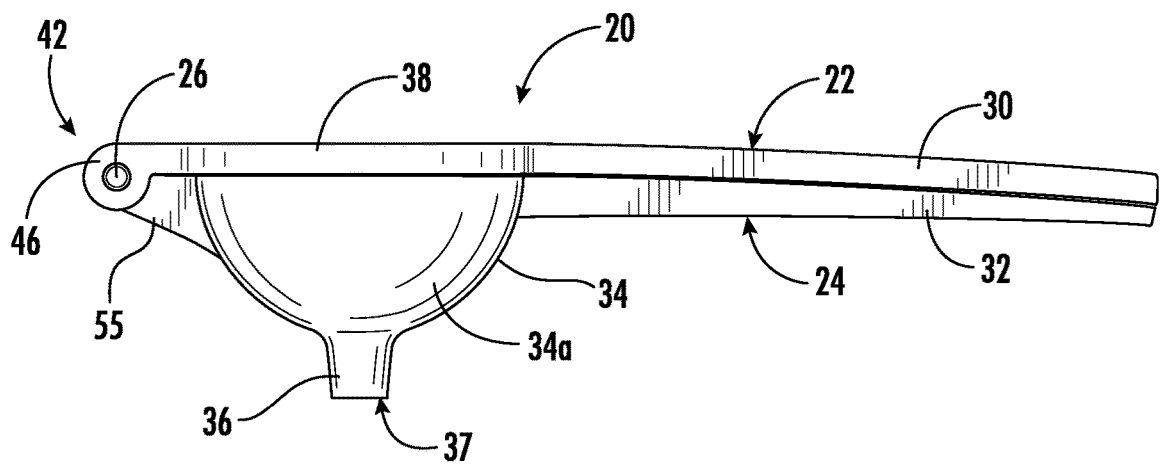
FIG. 9 is side view of the side opposite the side shown in FIG. 8.

A strainer or colander 54 with a plurality of holes therein may be removably disposed between the upper squeezing cup 40 and the lower squeezing cup 34. The strainer 54 may be half-spherical in shape and includes a concave surface 54a that corresponds to the squeezing surface 40b of the upper squeezing cup 40 and a convex surface 54b that fits snugly within the lower squeezing cup 34. The strainer may also be a corresponding shape other than a partial spherical shape to match the shape of the lower squeezing cup and the upper squeezing cup, for example, if the concave surface 54a holds the fruit while the fruit is being squeezed. The strainer 54 further includes holes 56 throughout its surface. The holes 56 allow the juice from the fruit through to the lower squeezing cup 34 and into the funnel 36, while preventing the pulp and the skin or peel from the fruit from passing into the funnel 36 and ultimately into the user's vessel 10. As shown in FIG. 6, the outlet 37 of the funnel 36 has a circumferential rim 39 defining the outlet 37 and the outlet 37 is open with nothing within the cross-sectional area 41 within the circumferential rim 39.

By including the colander or strainer 54 in the juicer 20, fruits that may tend to pass a large amount of pulp when they are juiced may be used without the inconvenience of having the pulp in the user's vessel or having to use an external strainer and a funnel when a typical user is already using both hands to squeeze the fruit. Having an easily removable colander or strainer 54 that holds the pulp makes it easy for the user to simply remove the colander or strainer 54 to dump the pulp and rinse the colander or strainer 54, if necessary, as well so a user can very quickly juice a second fruit right after the first without having to clean out the lower squeezing cup 34 and the funnel 36.

In an embodiment, a bottle opener 60 may be attached to the end of the squeeze handle 30 or the base handle 32 for easy removal of bottle tops. In another embodiment, a triangularly shaped support 55, which can be a generally planar rib, may extend from the hinge 42 to the lower squeezing cup 34 to offer strength and stability as the upper and lower squeezing cups 40, 34 are forced together over a fruit or other element being squeezed.

In use, a user may place the juicer funnel 36 into the interior volume of a portion of the neck 11 of the vessel 10, typically when the vessel 10 has a beverage within it that may be enhanced with the juice or that the user wants to add the juice thereto. The handle 30 is raised away from handle 32, opening the interior of the lower squeezing cup 34, either with or without the colander or strainer 54. A fruit(s) and/or vegetable(s), or at least a portion thereof, is placed within the lower squeezing cup 34 or the colander or strainer 54. The handle 30 is then brought back into proximity of the handle 32, bringing the upper squeezing cup 40 into contact with the fruit or vegetable within the lower squeezing cup 34 or the colander or strainer 54. The fruit(s) and/or vegetable(s) is squeezed between the cups 40, 34, and the liquid/juice within the fruit(s) and/or vegetable(s) is extracted from the fruit(s) and/or vegetable(s) and into the funnel 36. The funnel 36 uses gravity and directs the liquid/juice that was just squeezed from the fruit or vegetable into and through the neck 11 of the vessel 10 and into the main portion 13, where it mixes with the beverage within. After the juice is squeezed into the vessel, the user may place their finger or other covering over the top opening of the vessel 10 and swirl the vessel or otherwise agitate the liquids within the vessel to make a more homogeneous mixture of the liquid/juice and original beverage therein, such as water or beer or soda.

What is claimed is:

1. A juicer comprising:
   a presser portion comprising:
      an upper squeezing cup;
      an upper handle engaged with the upper squeezing cup on an exterior surface of the upper squeezing cup; and
      an upper hinge portion disposed on an opposite side of the upper squeezing cup from the upper handle and aligned with the upper handle;
   a funnel portion comprising:
      a lower squeezing cup having a downward facing surface and a cylindrically-shaped funnel integrally formed with the lower squeezing cup and having a side wall, wherein the cylindrically-shaped funnel extends downward from the downward facing surface of the lower squeezing cup and the cylindrically-shaped funnel has a tapered top that conforms to an exterior surface of the lower squeezing cup and the tapered top defined by the side wall of the cylindrically-shaped funnel is open to an interior volume of the lower squeezing cup, wherein the cylindrically-shaped funnel is hollow within an interior of the cylindrically-shaped funnel defined by the side wall, and wherein a bottom of the cylindrically-shaped funnel defines a bottom opening that provides juice out of the bottom opening during use of the juicer without straining a juice as the juice passes through the bottom opening of the cylindrically-shaped funnel;
      a lower handle engaged with the lower squeezing cup on the exterior surface of the lower squeezing cup; and
      a lower hinge portion disposed on an opposite side of the lower squeezing cup from the lower handle and aligned with the lower handle;
   a removable colander disposed between the upper squeezing cup and the lower squeezing cup when the juicer is in use, wherein the removable colander is not attached to the juicer and is removable from within the funnel portion by hand and without the use of tools and wherein the removable colander has a plurality of apertures wherein the plurality of apertures consists of circular shaped apertures; and
   wherein the downward facing surface of a perimeter flange around the upper squeezing cup contacts a top perimeter rim of the lower squeezing cup when the lower handle and the upper handle are in a closed position.

2. The juicer of claim 1, wherein the upper squeezing cup comprises a convex lower surface and the lower squeezing cup comprises a concave upper surface that mates into the closed position when the upper handle and the lower handle are proximate one another and wherein the convex lower surface is substantially the same shape as the concave upper surface of the lower squeezing cup and wherein the convex lower squeezing cup interior surface is smooth and the only aperture in the convex lower squeezing cup interior surface is the tapered top of the cylindrically-shaped funnel and wherein the concave upper surface is a solid continuous surface across the entire concave upper surface.

3. The juicer of claim 2, wherein the convex lower surface is configured to substantially fit within the concave upper surface and wherein the upper handle and the lower handle are in the closed position and the closed position occurs when the upper handle and the lower handle are brought into proximity with one another and wherein a top surface of the upper squeezing cup has a recessed center.

4. The juicer of claim 2, wherein the convex lower surface of the upper squeezing cup further comprises a plurality of ribs configured to squeeze a juiced item between longitudinal portions of the juiced item and wherein the cylindrically-shaped funnel is engaged with a bottom of the lower squeezing cup and wherein the lower squeezing cup has an upper perimeter having an upper diameter and a lower opening integrally engaged with the cylindrically-shaped funnel and having a funnel entry diameter, and wherein the upper diameter is larger than the funnel entry diameter and wherein the lower handle engaged with the lower squeezing cup has solid, flat top surface from a handle end proximate the lower squeezing cup to a distal end of the lower handle.

5. The juicer of claim 1, wherein at least a subset of the plurality of apertures in the removable colander are not aligned with funnel or a central axis of the funnel when the removable colander is spaced within the lower squeezing cup.

6. The juicer of claim 5, wherein the removable colander has an upper perimeter and wherein the entire upper perimeter of the colander is positioned below the upper perimeter of the lower squeezing cup when the colander is spaced within the lower squeezing cup and comprises a concave surface, an opposite convex surface that has substantially the same shape as the concave surface and the plurality of apertures extending through the colander from the concave surface to a convex surface adapted to allow juice from a fruit being juiced via compression from a concaved, ribbed squeezer to drain into and through the funnel portion.

7. The juicer of claim 1, wherein the upper hinge portion has a through hole that receives a hinge pin with an interference fit to hold the hinge pin stationary with respect to the upper hinge portion and wherein the lower hinge portion has a through hole that receives the hinge pin with an interference fit to hold the hinge pin stationary with respect to the lower hinge portion and wherein the upper hinge portion and the lower hinge portion form a juicer hinge consisting of the upper hinge portion, the lower hinge portion, and the hinge pin.

8. A method of juicing a fruit or a vegetable to yield juice from the fruit or the vegetable and directly delivering the juice from the fruit or the vegetable into a vessel having a neck portion and a main body portion and including a beverage therein comprising the steps of:
    inserting the cylindrically-shaped funnel of the juicer of claim 1 into the neck portion of a bottle;
    inserting at least a portion of the fruit or a portion of the vegetable or a whole fruit or a whole vegetable into the upper squeezing cup; and
    using manual force to bring the upper handle into a location proximate the lower handle thereby applying a force with a bottom surface of the upper squeezing cup to the at least a portion of the fruit or the portion of the vegetable or the whole fruit or the whole vegetable thereby delivering juice from the at least a portion of the fruit or the portion of the vegetable or the whole fruit or the whole vegetable and delivering the juice by gravity directly into engagement with the beverage within the bottle.

9. The method of claim 8, wherein the vessel is the bottle and the main body portion is a cylindrically shaped main body portion of the bottle and the beverage is a beer and the portion of the fruit or the portion of the vegetable or the whole fruit or the whole vegetable is a portion of a lemon or a portion of a lime or a whole lemon or a whole lime and wherein a neck of the bottle has a diameter that is smaller than a diameter of the cylindrically shaped main body portion of the bottle and wherein the cylindrically shaped main body portion has a larger cross-sectional area than a cross sectional area of the neck portion.

10. The method of claim 9, wherein the removable colander is removable by hand and without the use of tools; and
    wherein the removable colander is a half-sphere and comprises a concave surface, an opposite convex surface and the plurality of apertures extending through the removable colander from the concave surface to the opposite convex surface adapted to allow juice from a fruit being juiced via compression from a concaved, ribbed squeezer to drain into and through the cylindrically-shaped funnel.

11. The juicer of claim 1, further comprising a bottle opener integrally formed into the lower handle or the upper handle.

12. The juicer of claim 1, wherein the lower hinge portion is engaged to and integrally formed with the lower squeezing cup and the upper hinge portion is engaged to and integrally formed with the upper squeezing cup and wherein the juicer further comprises a strength reinforcing ridge engaged to the lower hinge portion and extending to and also engaged with the lower squeezing cup.

13. The juicer of claim 1, wherein either:
1) The upper hinge portion comprises a single upper central boss having an upper central boss hinge pin receiving aperture therein and wherein the lower hinge portion comprises a left lower boss having a left lower boss hinge pin receiving aperture and a right lower boss having a right lower boss hinge pin receiving aperture and wherein the left lower boss and the right lower boss are aligned with one another and spaced apart from one another on opposite sides of the single upper central boss and there is a hinge pin spaced within and through each of the left lower boss hinge pin receiving aperture, the right lower boss hinge pin receiving aperture and the upper central boss hinge pin receiving aperture; or
2) The upper hinge portion comprises a left upper boss and a right upper boss that are spaced apart from one another and wherein the left upper boss has a left upper boss hinge pin receiving aperture and the right upper boss has a right upper boss hinge pin receiving aperture and the left upper boss hinge pin receiving aperture and the right upper boss hinge pin receiving aperture are aligned with one another and wherein the lower hinge portion comprises a single lower central boss having a central boss hinge pin receiving aperture and wherein the left upper boss and the right upper boss are spaced apart from one another and on opposite sides of the single lower central boss and there is a hinge pin spaced within and through each of the left upper boss hinge pin receiving aperture, the right upper boss hinge pin receiving aperture and the central boss hinge pin receiving aperture.

14. A juicer comprising:
a unitary squeeze handle assembly comprising:
    a squeeze cup;
    an upper hinge engaged with an exterior surface of the squeeze cup; and
    an upper handle portion extending from the squeeze cup in a direction opposite from the upper hinge;
a unitary base handle assembly comprising:
    a base cup with a downwardly extending hollow funnel extending downward from the base cup configured to receive juice received by the base cup and wherein the downwardly extending hollow funnel includes a bottom funnel perimeter defining an outlet that is free of any obstruction; wherein the downwardly extending hollow funnel has a tapered top that conforms to the exterior surface of the base cup and the tapered top defined by a side wall of the downwardly extending hollow funnel is open to an interior volume of the base cup, wherein the downwardly extending hollow funnel is hollow within an interior of the downwardly extending hollow funnel defined by the side wall; a base hinge engaged
    with an exterior surface of the base cup; and
    a base handle portion integrally formed and connected to the base cup and extending from the base cup in a direction opposite from the base hinge;
a unitary, removable colander having a half-sphere shape removably disposed within the base cup, the unitary, removable colander comprising a concave surface, an opposite convex surface and a plurality of apertures extending through the unitary, removable colander from the concave surface to a convex surface adapted to allow juice from a fruit being juiced via compression from the squeeze cup to drain into and through the base cup;
a hinge portion consisting of the upper hinge and the base hinge matingly engaged to one another and a hinge pin disposed between the upper hinge and the base hinge and wherein the hinge pin fits into an upper hinge through-hole on the upper hinge and a base hinge through-hole on the base hinge;

wherein the removable colander is a separate piece from the rest of the juicer and is not attached to the juicer and the unitary, removable colander is removable from within the interior of the base cup by hand and without the use of tools; and wherein a downward facing surface of a perimeter flange around the squeeze cup contacts a top perimeter rim of the base cup when the base handle portion and the upper handle portion are in a closed position.

15. The juicer of claim 14, wherein a concave upper surface of the base cup is smooth and uninterrupted.

16. The juicer of claim 14, wherein the through hole in the upper hinge is configured to receive the hinge pin with an interference fit to hold the hinge pin stationary with respect to the upper hinge and wherein the through hole in the base hinge receives the hinge pin with an interference fit to hold the hinge pin stationary with respect to the base hinge.

17. The juicer of claim 14, wherein the squeeze cup comprises a convex lower surface and the base cup comprises a concave upper surface and wherein the convex lower surface substantially fits within the concave upper surface.

18. The juicer of claim 17, wherein the convex lower surface of an upper squeezing cup further comprises ribs configured to squeeze a juiced item between longitudinal portions of the juiced item, and wherein the convex lower surface and the concave upper surface are concentric and substantially the same shape and nested within one another when the juicer is in a closed position.

19. The juicer of claim 14 wherein the plurality of apertures consist of circular apertures and wherein more than one of the plurality of apertures do not align with the outlet or an axis of the outlet.

* * * * *